United States Patent [19]

Strassheimer

[11] 4,023,466
[45] May 17, 1977

[54] APPARATUS FOR REGULATING THE SPEED OF AND THE PRESSURE OF FLUID UPON THE RAM IN THE INJECTION ASSEMBLY OF AN INJECTION MOLDING MACHINE

[75] Inventor: Herbert Strassheimer, Bischofsheim, Germany

[73] Assignee: GKN Windsor GmbH, Bischofsheim, Germany

[22] Filed: Aug. 7, 1974

[21] Appl. No.: 495,525

[30] Foreign Application Priority Data

Aug. 8, 1973 Germany .................. 2340096

[52] U.S. Cl. .................................. 91/6; 60/486; 60/494; 91/446; 91/449; 251/60; 251/63; 251/210; 164/315; 425/145

[51] Int. Cl.² ............................... F01B 25/02

[58] Field of Search ............ 91/461, 6, 446, 449; 251/31, 60, 63, 122, 210, 63.5; 60/494, 486; 425/145; 164/315

[56] References Cited

UNITED STATES PATENTS

| | | | |
|---|---|---|---|
| 1,455,211 | 5/1923 | Kelly | 251/31 X |
| 2,185,016 | 12/1939 | Burdick | 251/31 X |
| 2,265,800 | 12/1941 | Connor | 51/290 |
| 2,276,895 | 3/1942 | Josseler | 417/428 X |
| 2,340,489 | 2/1944 | Pontius | 251/31 X |
| 2,708,091 | 5/1955 | Ho Yun Rim | 251/60 X |
| 3,155,365 | 11/1964 | Hartung | 251/31 X |
| 3,298,389 | 1/1967 | Freeman | 251/122 |
| 3,426,799 | 2/1969 | Kintner | 251/31 X |
| 3,499,286 | 3/1970 | Reischl | 60/430 X |
| 3,524,386 | 8/1970 | Cudnohufsky | 91/461 |
| 3,608,435 | 9/1971 | Conabee | 91/461 X |
| 3,638,530 | 2/1972 | Hollister | 91/461 X |
| 3,739,690 | 6/1973 | Cryder | 91/461 X |
| 3,767,339 | 10/1973 | Hunkar | 425/145 |
| 3,776,101 | 12/1973 | Nussbaumer | 91/461 X |
| 3,779,680 | 12/1973 | Manceau | 425/145 |
| 3,791,408 | 2/1974 | Saitou | 137/529 |
| 3,794,292 | 2/1974 | Jaegtnes | 251/31 |
| 3,876,736 | 4/1975 | Takiura | 425/145 |

FOREIGN PATENTS OR APPLICATIONS

| | | | |
|---|---|---|---|
| 45,235 | 4/1935 | France | 251/122 |
| 1,011,238 | 6/1957 | Germany | 251/63.5 |

*Primary Examiner*—William R. Cline
*Assistant Examiner*—Abraham Harshkovitz
*Attorney, Agent, or Firm*—Michael J. Striker

[57] ABSTRACT

An injection molding machine wherein the ram in the injection cylinder can be moved at several speeds and can be subjected to different fluid pressures by an apparatus having a two-way valve whose inlet is connectable to one or more pumps by way of discrete check valves and whose outlet is connected with a chamber of the injection cylinder by a conduit containing an electrically adjustable pressure relief valve. The valve member of the two-way valve is movable between a first position in which it completely seals the inlet from the outlet and several second positions in which it acts as a flow regulating means to permit the fluid to flow from the inlet to the outlet at a selected rate. The valve member is movable by a solenoid-operated pilot valve which cooperates with a stop extending into the path of movement of the valve member and being movable axially by a reversible motor which is controlled by the programming system of the injection molding machine. The programming system adjusts the pressure relief valve, moves the valve member of the pilot valve and selects the number of pumps which deliver fluid to the inlet of the two-way valve.

5 Claims, 2 Drawing Figures

APPARATUS FOR REGULATING THE SPEED OF AND THE PRESSURE OF FLUID UPON THE RAM IN THE INJECTION ASSEMBLY OF AN INJECTION MOLDING MACHINE

BACKGROUND OF THE INVENTION

The present invention relates to injection molding machines for synthetic thermoplastic materials, and more particularly to improvements in apparatus for regulating the speed of, and the magnitude of fluid pressure acting upon, the ram of the injection cylinder in an injection molding machine.

An injection molding machine comprises two basic assemblies, namely a clamping unit which carries the sections of a partible mold and includes means for moving the sections toward or away from each other as well as for maintaining the sections in engagement with each other during injection of plasticized material and subsequent cooling, and an injection unit which causes plasticized synthetic thermoplastic material to flow into the cavity or cavities of the closed mold and applies the pressure which is necessary to insure that each cavity is completely filled with plasticized material as well as that the pressure is maintained during cooling and resulting contraction of shaped article(s). As a rule, the clamping forces and the forces which are needed to move the ram of the injection unit are produced by a highly pressurized hydraulic fluid medium, normally oil. The injection unit is associated with or embodies a plasticizing unit which receives granular plastic material from a feeder and converts it into a flowable mass which is thereupon injected into the mold in response to a forward stroke of the ram in the injection cylinder. The The pressure of fluid which moves the ram in the injection cylinder must be regulated with a high degree of accuracy and reproducibility in order to insure uniform filling of each cavity with plasticized material as well as that the material in each cavity is maintained under requisite pressure during hardening and resulting conversion into a shaped article. The pressure which is to be maintained during setting depends on the characteristics (shrinkage) of thermoplastic material.

The essential parameters in the operation of an injection molding machine, and more particularly in the operation of the injection unit, include the injection pressure, the pressure during setting of injected material, the speed of forward movement of the ram, and the screw back pressure. In presently known apparatus for regulating the admission of pressurized hydraulic fluid into the injection cylinder of an injection molding machine, the fluid flows through a directional control valve having a reciprocable spool. The leakage of fluid in such valves does not allow for accurate and reproducible regulation of fluid pressure in the chamber of the injection cylinder and/or for accurate regulation of the speed of the ram which is used to inject plasticized material into the closed mold. This is due to the fact that the spool does not engage a seat when it is supposed to prevent the flow of fluid, i.e., the land or lands of the spool merely extend into cylindrical portions of the bore in the valve body.

SUMMARY OF THE INVENTION

An object of the invention is to provide a simple, compact and reliable apparatus for regulating the flow of pressurized hydraulic fluid into the injection cylinder of an injection molding machine.

Another object of the invention is to provide the apparatus with novel means which renders it possible to regulate the pressure of hydraulic fluid and/or the speed of the ram in the injection cylinder within a wide range and with a high degree of reproducibility.

A further object of the invention is to provide a novel and improved valve for use in the above outlined regulating apparatus.

An additional object of the invention is to provide a regulating apparatus which can be controlled by available programming systems and wherein the pressure of hydraulic fluid which is being admitted into the injection cylinder during introduction of plasticized material into a mold can be regulated stepwise as well as infinitely and within a wide range.

A further object of the invention is to provide an injection molding machine which embodies the improved regulating apparatus.

The invention is embodied in an apparatus for regulating the speed of and the fluid pressure acting upon the ram in the injection cylinder of an injection molding machine for thermoplastic materials wherein the injection cylinder has a chamber for reception of pressurized hydraulic fluid. The apparatus comprises essentially a two-way valve including a housing provided with an inlet and an outlet and a valve member which is movable in the housing between at least one first position in which the inlet is completely sealed from the outlet and a plurality of second positions in each of which the valve member allows pressurized fluid to flow from the inlet to the outlet but at a different rate, means for moving the valve member including a pilot valve a portion of which is movable between a first position corresponding to the first position of the valve member in the housing of the two-way valve and a second position in which the valve member is urged to one of its second positions, a conduit which connects the outlet of the housing of the two-way valve with the chamber of the injection cylinder, adjustable pressure relief valve means in the conduit, and a source of pressurized hydraulic fluid including a plurality of discrete pumps, means for connecting a selected number of pumps to the inlet of the housing of the two-way valve, and discrete check valves for preventing the flow of fluid from the inlet to the pumps.

The novel features which are considered as characteristic of the invention are set forth in particular in the appended claims. The improved regulating apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
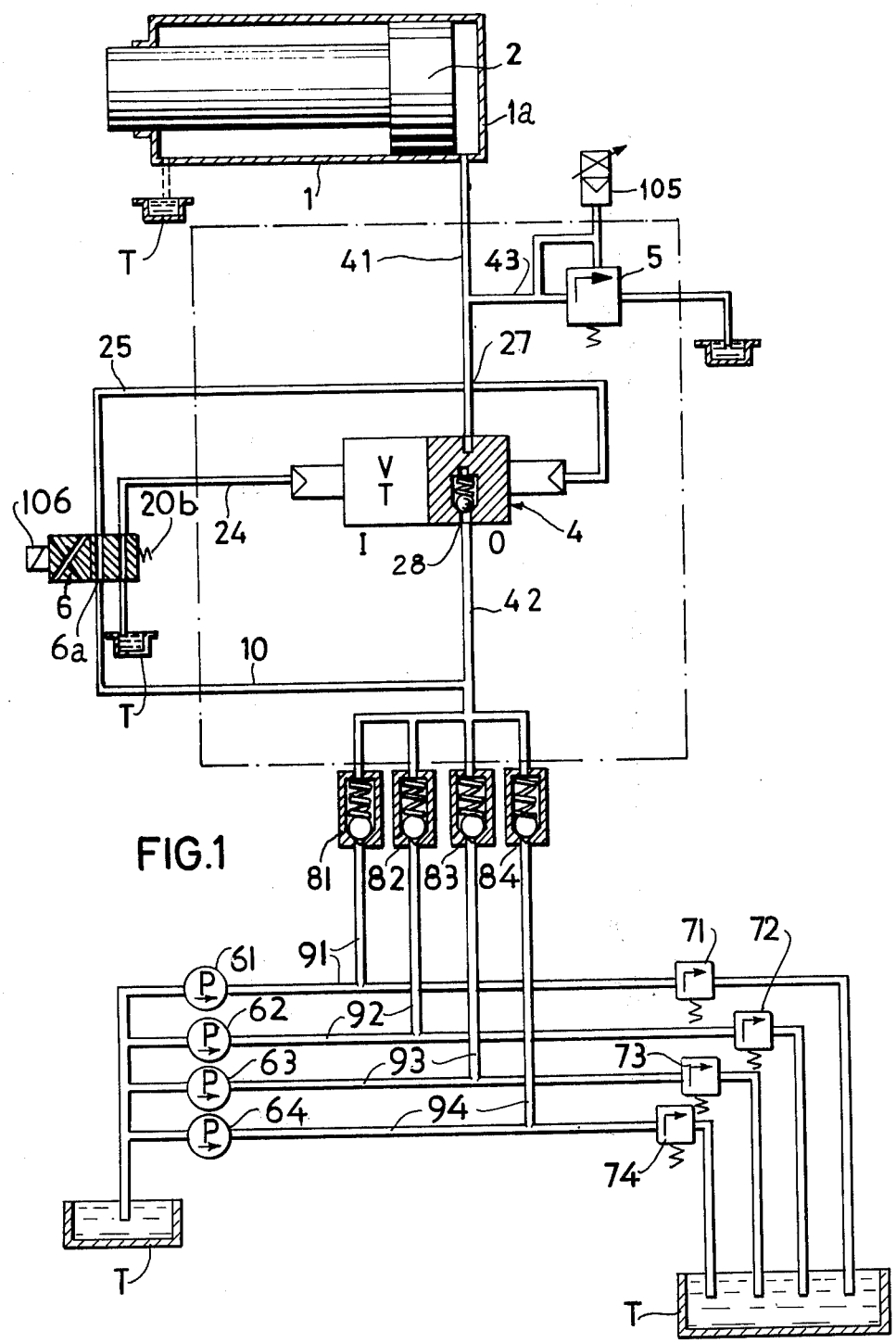
FIG. 1 is a diagrammatic view of the improved regulating apparatus, further showing the cylinder and the ram of the injection unit.

FIG. 1 shows the injection cylinder 1 of an injection molding machine which further comprises a customary open-and-shut mold, a clamping unit for the mold, and preplasticizing means for granulate. The cylinder 1 receives a reciprocable piston or ram 2 which can force preplasticized material into one or more cavities of the mold in a manner not forming part of the invention. The right-hand chamber 1a of the injection cylinder 1 is connected with the outlet 27 of a two-way valve 4 by one or more conduits 41. The illustrated conduit 41 is connected with the tank T by a branch conduit 43 containing an adjustable pressure relief valve 5. The two-way valve 4 is controlled by a pilot valve 6 and its inlet 28 is connected with a supply conduit 42 which can receive pressurized fluid from one or more pumps 61, 62, 63, 64. The outlets of the pumps 61–64 are connected with the supply conduit 42 by discrete pipes 91, 92, 93, 94 which respectively contain one-way ball check valves 81, 82, 83, 84. A conduit 10 branches from the conduit 42 to supply pressurized fluid to the inlet 6a of the pilot valve 6. The latter is connected with the valve 4 by means of two control lines 24 and 25.

Figure 2:
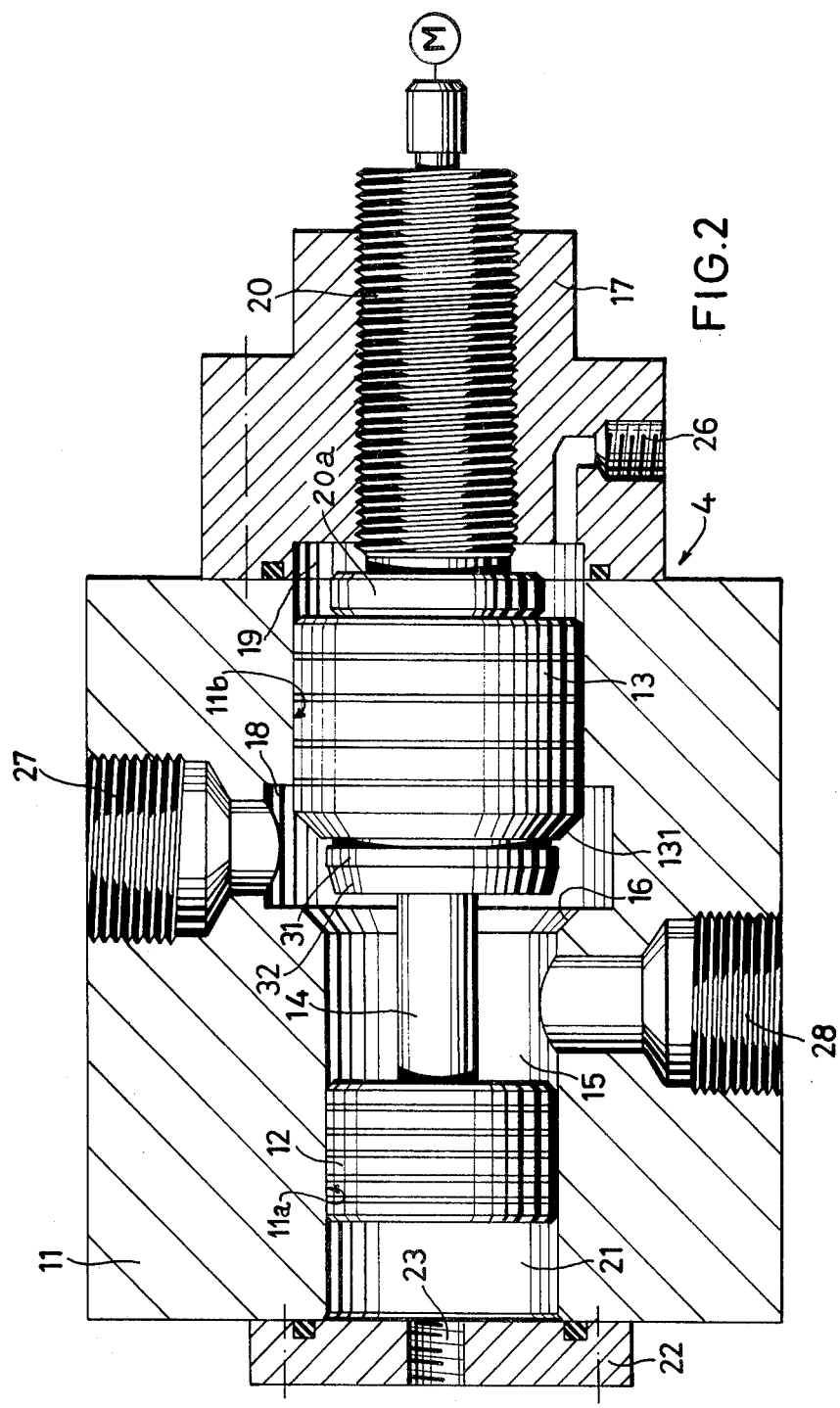
FIG. 2 is an enlarged axial sectional view of the two-way valve.

The details of the two-way valve 4 are shown in FIG. 2. This valve comprises a valve housing or body 11 for a reciprocable valve member having a smaller-diameter section or land 12, a larger-diameter section or land 13 and a stem 14 which connects the sections 12, 13 to each other. The smaller-diameter section 12 divides the corresponding portion 11a of the bore in the housing 11 into chambers 15 and 21. The chamber 15 extends to a conical seat 16 which is machined into the housing 11 at the right-hand end of the portion 11a and is adjacent to a throttling compartment 18 which connects the portion 11a with a larger-diameter portion 11b for the section 13 of the valve member. The cylinder 19 (which constitutes the rightmost part of the portion 11b of the bore in the housing 11) has a diameter which is greater than that of the portion 11a but smaller than that of the throttling compartment 18.

The extent to which the section 13 is movable in a direction to the right when the control line 24 admits pressurized hydraulic fluid from the conduit 10 into the chamber 21 is determined by the axial position of an adjustable stop here shown as a feed screw 20 meshing with a spindle nut 17 which is affixed to the right-hand end face of the housing 11. FIG. 2 shows the valve 4 in open position because the section 13 of the valve member permits pressurized hydraulic fluid to flow from the inlet 28 to the outlet 27, i.e., from the supply conduit 42 to the conduit 41 and into the chamber 1a of the injection cylinder 1.

The open left-hand end of the portion 11a of the bore in the housing 11 is overlapped by a closure or cover member 22 which is bolted or otherwise affixed to the housing 11 and has a tapped bore 23 for a nipple at the right-hand end of the control line 24. The cylinder 19 at the right-hand side of the section 13 communicates with a tapped bore 26 which is machined into the spindle nut 17 and receives a nipple, not shown, at the corresponding end of the control line 25. The section 13 moves away from the head 20a of the feed screw 20 when the control line 24 communicates with the tank T and the control line 25 admits pressurized fluid to the cylinder 19. Inversely, the pilot valve 6 will urge the section 13 against the head 20a when the control line 24 is connected with the conduit 10 and the control line 25 is connected to the tank T.

The length of the stem 14 is selected in such a way that, when the control line 24 connects the chamber 21 to the tank T, the section 12 is immediately or closely adjacent to the closure 22 and a conical sealing portion 131 of the section 13 abuts against and sealingly engages the complementary conical seat 16 in the housing 11 to effectively seal the inlet 28 from the outlet 27. The sealing portion 131 of the section 13 carries a flow regulating device including a cylindrical element 31 which can be received in the portion 11a without any or with minimal clearance to thus prevent leakage of pressurized fluid from inlet 28 to outlet 27 when the valve 4 is closed, and a conical element 32 which can cooperate with the seat 16 to form therewith an annular clearance serving to permit an accurately controlled flow of pressurized fluid from the inlet 28 to outlet 27 when the valve 4 is being opened, i.e., when the chamber 21 is filled with pressurized fluid so that such fluid urges the section 13 against the head 20a of the feed screw 20 and the feed screw is being rotated in a direction to move to the right, as viewed in FIG. 2, to thereby allow the element 31 to move beyond the right-hand end of the portion 11a and to thus enable the element 32 to allow the fluid to flow from the conduit 42 to the conduit 41. It will be seen that the element 31 continues to seal the inlet 28 from the outlet 27 after the conical portion 131 of the section 13 moves away from the seat 16, i.e., that the flow of fluid to the conduit 41 begins only when the element 31 is expelled from the portion 11a. The valve member 12–14 is movable between at least one first position in which the valve member of the pilot valve 6 connects the conduit 10 with the control line 25 and a plurality of second positions in each of which the valve member of the pilot valve 6 connects the conduit 10 with the pressure line 24 and the valve member 12–14 allows pressurized fluid to flow from the inlet 28 to the outlet 27 but at a different rate.

The operation:

When the injection molding machine is idle, the valve member of the pilot valve 6 is in the position shown in FIG. 1, i.e., the control line 24 connects the chamber 21 with the tank T and the control line 25 connects the conduit 10 with the cylinder 19. The portion 131 of the section 13 sealingly engages the seat 16 so that the inlet 28 is completely sealed from the outlet 27. Also, the setting of the relief valve 5 is then such that the valve offers negligible resistance to the outflow of fluid from the chamber 1a of the injection cylinder 1. Therefore, the ram 2 can perform a return stroke to thereby expel fluid from the chamber 1a into the tank T via conduits 41, 43 and valve 5.

In order to start an injecting operation, the solenoid 106 of the pilot valve 6 is energized by a programming system (not shown) so that the control line 24 begins to communicate with the conduit 10 and the control line 25 begins to connect the cylinder 19 with the tank T. The valve member 12–14 of the two-way valve 4 leaves its closed or first position to the extent which is determined by the axial position of the feed screw 20 whereby the conical portion 131 moves away from the seat 16 and the inlet 28 admits pressurized fluid into the throttling compartment 18 and thence into the conduit 41 to the extent which is determined by the axial position of the conical element 32. The four pumps 61–64 are assumed to be in operation and deliver pressurized fluid (e.g., oil) to the chamber 15 in the housing 11 of the valve 4. The pressurized fluid can flow from the pumps 61–64 toward the chamber 15 but is prevented from flowing in the opposite direction by the respective check valves 81–84.

The pressure relief valve 5 is adjusted simultaneously with movement of the valve member 12–14 from its closed position, e.g., by means of a potentiometer 105 which is adjusted as a function of movement of the shank 4 in a direction to the right, as viewed in FIG. 2.

The number of pumps which deliver pressurized fluid into the chamber 15 of the housing 11 can be selected by the aforementioned programming system and depends on the desired output of the injection molding machine. All of the pumps 61-64 preferably remain in operation so that they are always in a position to deliver fluid into the conduit 42 as soon as the programming system closes the respective shutoff valves 71, 72, 73, 74 which are installed in the pipes 91-94 and allow pressurized fluid to flow back to the tank T as long as they remain open. The number of pumps can be increased beyond four or reduced to two or three, depending upon the desired number of speeds of the ram 2.

The feed screw 20 can be rotated by a reversible motor M which is controlled by the programming system so that it can change the rate of flow of pressurized fluid from the conduit 42 to the conduit 41 while the number of pumps which supply fluid to the chamber 15 remains unchanged. This allows for a very accurate regulation of the injection speed. The motor M can be driven at several speeds to thus change the rate at which the speed of the ram 2 changes in response to axial movement of the feed screw 20.

The valve member of the pilot valve 6 is automatically reset by a spring 20b upon completion of an injection cycle whereby the control line 25 admits pressurized fluid into the cylinder 19 and the portion 131 of the section 13 returns into sealing engagement with the seat 16 of the housing 11. The outlet 27 is then sealed from the inlet 28 because the portion 131 bears against the seat 16 and the cylindrical element 31 extends into the portion 11a of the bore in the housing 11. The resistance which the valve 5 offers to the flow of fluid from the conduit 41 into the tank T (via conduit 43) decreases in delayed response to movement of the section 13 in a direction toward the closure 22 whereby the rotating plasticizing screw (not shown) which moves the ram 2 in a direction to the right, as viewed in FIG. 1, enables the ram to expel liquid from the chamber 1a.

Since the valve 4 prevents the flow of any liquid from the inlet 28 to the outlet 27 when the conical portion 131 engages the seat 16, and since the valve 5 is adjustable with and independently of the piston 12-14, the valve 5 can insure that the fluid pressure in the chamber 1a remains constant while the ram 2 dwells in its extended position upon completion of an injecting step for as long as is necessary to allow the material in the cavity or cavities of the mold to set.

The details of the aforementioned programming system which selects the various pressures, actuates the motor M and pilot valve 6 in a desired sequence, and connects or disconnects one or more pumps to the conduit 42 form no part of the invention.

An advantage of the improved valve 4 is that it can constitute a reliable and effective shutoff valve in the first position or positions of the valve member 12-14 and that it constitutes a highly accurate flow regulating valve or flow restrictor in each second position of the valve member 12-14. The number of pumps which are free to supply pressurized fluid to the chamber 15 depends on the desired speed of the ram 2 and on the selected second position of the valve member 12-14. The non-connected pumps can remain operative because, as soon as one of the shutoff valves 71-74 is opened by the programming system of the injection molding machine, the output of the respective pump is returned to the tank 71 rather than opening the corresponding check valve 81, 82, 83 or 84. The speed of the ram 2 increases or decreases stepwise in response to opening or closing of one or more valves 71-74. The injection pressure, the pressure of fluid following the injection and the screw back pressure are controlled by the valve 5. The utilization of electrically operated valves (6, 5 and 71-74) is preferred at this time because such valves can be actuated by many types of available programming systems.

The valve 4 insures that no leakage of fluid takes place in the first position of the valve member 12-14, i.e., at least in that position when the sealing portion 131 engages the seat 16. This enables the programming system to select the fluid pressure in the chamber 1a and the speed of the ram 2 with a high degree of reproducibility.

Without further analysis, the foregoing will so fully reveal the gist of the present invention that others can by applying current knowledge readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. Apparatus for regulating the speed of and the fluid pressure acting upon the ram in the cylinder of an injection molding machine for thermoplastic material wherein the injection cylinder has a chamber for reception of pressurized fluid, comprising a two-way valve including a housing having a bore including a smaller diameter first portion, a larger diameter second portion, and a compartment between said portions, an inlet communicating with said first of said bore portions and an outlet communicating with said compartment, said valve including further a valve member movable in said housing between at least one first position in which said inlet is sealed from said outlet and a plurality of second positions in each of which said valve member allows said fluid to flow from said inlet to said outlet but at a different rate, said valve member including interconnected first and second sections respectively slidable in said first and second portions of said bore and respectively defining with said bore portions first and second chambers to opposite sides of said valve member, said housing further having a conical seat located in said compartment adjacent said first portion of said bore, said second section of said valve member which is slidable in said second portion of said bore having a conical sealing portion which engages said seat in said first position of said valve member and said sealing portion including a flow regulating device comprising a cylindrical element which is sealingly received in said first portion of said bore in said first position of said valve member, and a conical element rigid with said cylindrical element and defining with said seat a clearance whose size varies in response to movement of said valve member between said plurality of positions; a conduit connecting said outlet with the chamber of said injection cylinder; a source of pressurized hydraulic fluid connected to said inlet; means for selectively feeding and discharging pressurized fluid from said source into and out from said chambers for moving said valve member between said positions thereof; and stop means extending into said second chamber and being movable axially of said housing to thus select the second position of said valve member.

2. Apparatus as defined in claim 1, wherein said means for selectively feeding and discharging pressurized fluid from said source into and out from said chambers comprise a two-position pilot valve having a second inlet connected with said source, a first control line which admits pressurized fluid from said second inlet into said second chamber in a first position of said pilot valve to urge said valve member to said first position thereof, and a second control line which admits pressurized fluid from said second inlet to said first chamber in a second position of said pilot valve to urge said valve member against said stop means.

3. Apparatus as defined in claim 1, and including adjustable pressure relief valve means in said conduit, and electric adjusting means for adjusting said pressure relief valve means.

4. Apparatus as defined in claim 1, wherein said source of pressurized fluid includes a plurality of pumps, means for connecting said plurality of pumps in parallel to said inlet, and discrete check valves for preventing the flow of fluid from said inlet to said pumps.

5. Apparatus as defined in claim 4, wherein said means for connecting a selected number of pumps to said inlet comprises a plurality of pipes respectively connecting said pumps with said check valve, a plurality of branch conduits respectively branching off from said pipes, a shut-off valve in each of said branch conduits movable between an open position connecting the respective branch conduit to a tank and a closed position.

* * * * *